(12) United States Patent
Archambault et al.

(10) Patent No.: US 7,877,739 B2
(45) Date of Patent: *Jan. 25, 2011

(54) METHOD OF PARTIALLY COPYING FIRST AND LAST PRIVATE ARRAYS FOR PARALLELIZED LOOPS BASED ON ARRAY DATA FLOW

(75) Inventors: Roch G. Archambault, North York (CA); Erik P. Charlebois, Pickering (CA); Guansong Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1143 days.

This patent is subject to a terminal disclaimer.

(21) Appl. No.: 11/539,756

(22) Filed: Oct. 9, 2006

(65) Prior Publication Data
US 2008/0086271 A1    Apr. 10, 2008

(51) Int. Cl.
*G06F 9/45* (2006.01)
(52) U.S. Cl. ............... 717/141; 717/142; 717/150; 717/155; 717/160
(58) Field of Classification Search ............... None
See application file for complete search history.

(56) References Cited

U.S. PATENT DOCUMENTS

2004/0221281 A1* 11/2004 Suganuma ............... 717/151

OTHER PUBLICATIONS

"OpenMP Application Program Interface" Version 2.5 May 2005. 246 pages.
Junjie Gu, et al. "Efficient Interprocedural Array Data-flow Analysis for Automatic Program Parellelization." IEEE transactions on Software Engneering, the special issue on Architecture-Independent Languages and Software Tools for Parallel Processing. pp. 0-32.
Junjie Gu, et al. "Symbolic Array Dataflow Analysis for Array Privatization and Program Parallelization". Association for Computing Machinery, Inc. 1995. pp. 1-35.
Manish Gupta, et al. "Automatic Parallelization of Recursive Procedures." 10 pages.
Peng Tu, "Automatic Array Privatization and Demand-Driven Symbolic Analysis." Copyright 1995.

* cited by examiner

*Primary Examiner*—Chuck O Kendall
(74) *Attorney, Agent, or Firm*—Cantor Colburn LLP

(57) ABSTRACT

A computer-implemented method for determining whether an array within a loop can be privatized for that loop is presented. The method calculates the array sections that require first or last privatization and copies only those sections, reducing the privatization overhead of the known solutions.

6 Claims, 2 Drawing Sheets

METHOD OF PARTIALLY COPYING FIRST AND LAST PRIVATE ARRAYS FOR PARALLELIZED LOOPS BASED ON ARRAY DATA FLOW

BACKGROUND OF THE INVENTION

1. Field of the Invention

This invention relates to privatizing arrays, and particularly to a method of partially copying first and last private arrays for parallelized loop based on array data flow.

2. Description of Background

Array data flow analysis is a known method for privatizing arrays. Such is generally discussed in publications entitled "Automatic Array Privatization and Demand-driven Symbolic Analysis", Peng Tu, 1995, Thesis, University of Illinois at Urbana-Champaign; "Efficient Interprocedural Array Data-Flow Analysis for Automatic Program Parallelization", Junjie Gu and Zhiyuan Li, IEEE Transactions on Software Engineering vol 26 number 3, pages 244-261, March 2000; and "Automatic Parallelization of Recursive Procedures", Manish Gupta and Sayak Mukhopadhyay and Navin Sinha, 1999, Proceedings of International Conference on Parallel Architectures and Compilation Techniques; each of which are incorporated by reference.

To prove that it is safe to privatize an array, every use of an array element must have a dominating definition in the same loop iteration. That is, every path from the top of the loop to the use of the array element must pass the definition site of the same array element. However, the approaches taken for first and last privatization in these methods are inefficient. In particular, first privatization of arrays is discouraged due to overhead problems.

The following example shows a loop that requires first and last privatization:

```
        a = 5
        do 40 j = 1, n
          do 20 i = 2 , m
            a(i) = b(i) + c(i)
20        continue
          do 30 i = 2, m
            a(i) = a(i–1) + 4
30        continue
40      continue
        print *, a(2:m)
```

Elements 2 to m of array a are defined in the first inner loop, while the second inner loop accesses elements 1 to m of the same array. The reference to the first element of a is exposed to the initial definition of a to 5. To privatize a, the initial elements of a must be copied to each of the private versions of a. This is known as first privatization in OpenMP terms.

Similarly, elements 2 to m of a are used after the loop. To privatize a correctly, the final iteration of the loop must copy its private version of a back to the shared version. This is known as last privatization in OpenMP terms.

In both cases, the existing algorithms copy the entire contents of the array in or out. This is undesirable because copying large arrays will be expensive. Since array sizes are often symbolic, it will be difficult for a compiler to know at compile-time whether the gains of will outweigh the cost of copying the array. The first privatization case is further complicated because, if the loop is parallelized, multiple processors will be copying from the shared global array, which could result in cache conflicts. For these reasons, first privatization of arrays is typically not done.

These types of opportunities are typically seen in biological algorithms that set initial conditions on the boundary of an array and then iteratively fill in the remaining values.

SUMMARY OF THE INVENTION

The shortcomings of the prior art are overcome and additional advantages are provided through the provision of a computer-implemented method for determining whether an array within a loop can be privatized for that loop. The method includes identifying target regions within an array. The target regions are accessible by a loop with access to the target regions being controlled by a guard. The identifying includes identifying a first set of the target regions that includes elements of the array that may be overwritten, identifying a second set of the target regions that includes elements of the array that will be overwritten, identifying a third set of the target regions that includes elements of the array that have a use not preceded by a definition along a path from a header of the loop, and identifying a fourth set of the target regions that includes elements of the array that are accessible by code intended to be executed after the loop has been executed. The method further includes determining, in any iteration of the loop, if a target region in the first set of the target regions overlaps any of the target regions in the third set of the target regions. When the target region in the first set of the target regions has been determined not to overlap any of the target regions in the third set of the target regions, determining, in any iteration of the loop, if the target region in the first set of the target regions overlaps any of the target regions in the fourth set of the target regions. When the target region in the first set of the target regions has been determined to overlap any of the target regions in the fourth set of the target regions, determining, over all iterations of the loop, if the first set of the target regions is contained in the second set of the target regions. When the first set of the target regions has been determined to be contained in the second set of the target regions, marking as private the target region in the first set of target regions that has been determined to overlap any of the target regions in the fourth set of target regions, ensuring that each of the target regions in the second set of target regions is marked as last private and that each of the target regions in the third set of target regions is marked as first private. Repeating steps the above for a each of the other target regions in the first set of target regions.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution that precisely calculates the array sections that require first or last privatization and copies only those sections, reducing the privatization overhead of the known solutions. By reducing this overhead, more privatization becomes reasonable, which in turn can enable other loop optimizations. Thus enabling a user interface extension to OpenMP to allow users to explicitly describe partial first and last privatization in Fortran. This gives Fortran OpenMP users an option to reduce the copying overhead implied by the first and last private constructs.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The FIGS. 1A-D illustrate one example of a flow diagram of calculating array sections that require first or last privatization in accordance with an exemplary embodiment of the present invention.

Figure 1A:
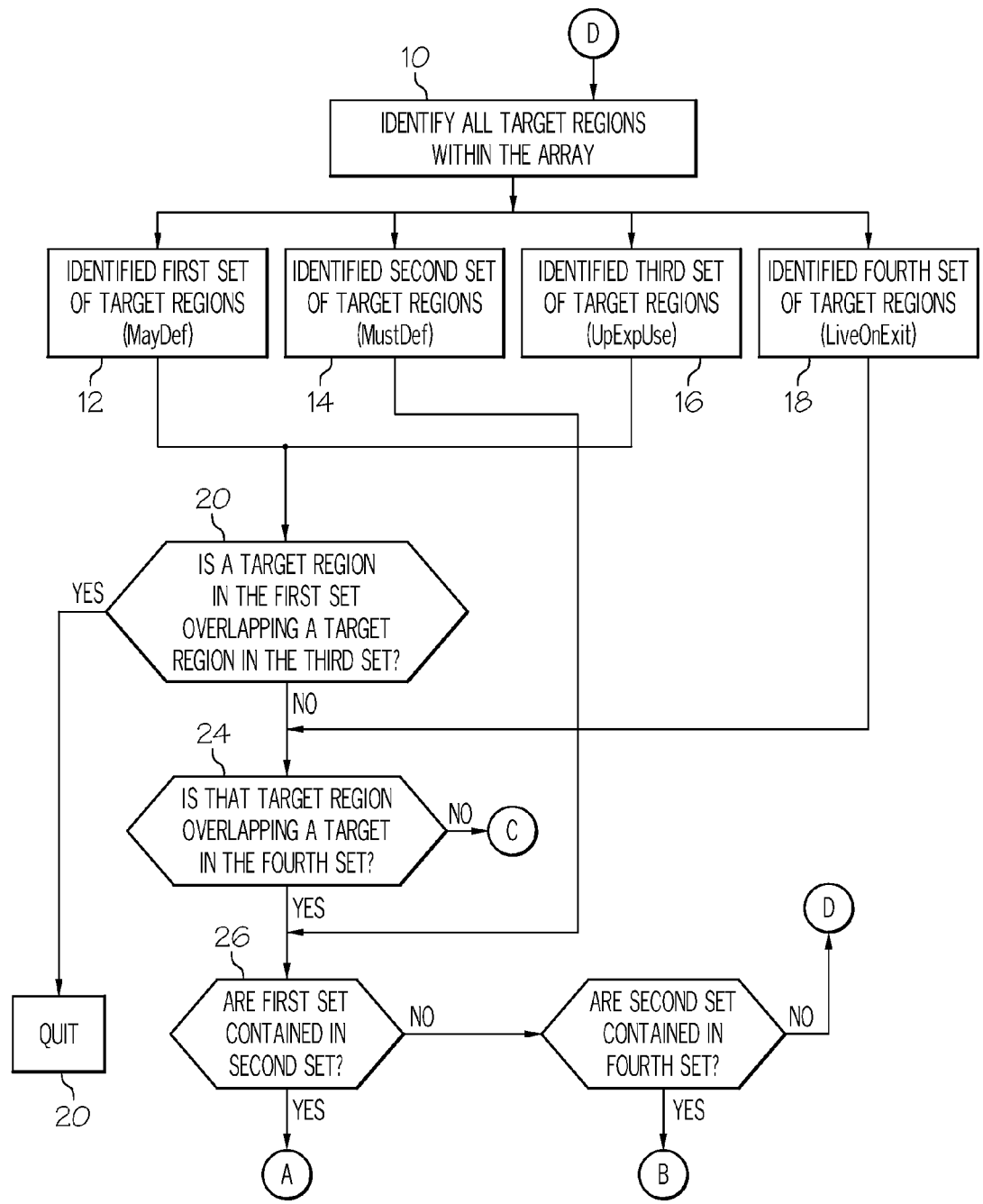

The detailed description explains the preferred embodiments of the invention, together with advantages and features, by way of example with reference to the drawings.

DETAILED DESCRIPTION OF THE INVENTION

Data structure of the present exemplary embodiment is similar to that described in the publication entitled "Automatic Parallelization of Recursive Procedures", Manish Gupta and Sayak Mukhopadhyay and Navin Sinha, 1999, Proceedings of International Conference on Parallel Architectures and Compilation Techniques, which has been incorporated herein by reference in its entirety. The framework this structure utilizes automatically parallelizing recursive procedures that typically appear in divide-and-conquer algorithms. This allows exploitation of a scalable form of nested parallelism, where each parallel task can further spawn off parallel work in subsequent recursive calls.

Arrays are accessed inside a loop and may be statically or dynamically allocated. A compiler (not shown) calculates the following information about an array access inside each loop.

MayDef set: array elements that may be written.

MustDef set: array elements that are definitely written.

UpExpUse set: array elements that may have an upward exposed use (that is, a use not preceded by a definition along a path from the loop header).

LiveOnExit set: array elements that are used after the loop region.

For each array, the information is represented using a list of Guarded Array Regions (GARs). A GAR is a tuple <G, D>, where D is a bounded Regular Section Descriptor (RSD) for the accessed array section and G is a guard that specifies the condition under which D is accessed. The bounded RSD provides information about the lower bound, upper bound, and the stride in each dimension, and thus represents sections that may be described using Fortran 90 triplet notation. Each bound, stride or predicate expression may include constants or scalars that are formal parameters or global variables, or it may take a statically unknown value, represented as ⊥. While performing a union or subtraction operation on GARs, if the result cannot be accurately represented using a single GAR, it is represented as a list of GARs.

The following algorithm is used to privatize an array used in a loop:

```
for each array A in the loop do
    for each GAR of A in the MayDef do
        if (GAR in all iterations intersects the UpExpUse of A) then
            Give up privatization A
        else
            if (GAR intersects the LiveOnExit of A) then
```

-continued

```
            if (MustDef of A contains MayDef of A in all iterations) then
                Mark GAR in MayDef as private
                Mark GAR in LiveOnExit as last private
            else
                if (MustDef of A contains LiveOnExit of A) then
                    Mark GAR in MayDef as private
                    Mark GAR in LiveOnExit as last private
        else
            Mark GAR in MayDef as private
        if (UpExpUse of A exist) then
            Mark GAR in UpExpUse as first private
```

When the algorithm completes, there may be multiple privatized GARs for one array. These are unioned to form the array section that needs to be copied in or out. An implementing compiler can then use this information to generate code to copy only the necessary array sections. In the example from the previous section, only a(1) would need to be copied in to private versions of a and only a (2:m) needs to be copied out from the last iteration of the loop.

An extension to OpenMP for partial first and last privatization is presented. The OpenMP Application Program Interface (API) supports multi-platform shared-memory parallel programming in C/C++ and Fortran on all architectures, including Unix platforms and Windows NT platforms. OpenMP is a portable, scalable model that gives shared-memory parallel programmers a simple and flexible interface for developing parallel applications for various platforms.

The original OpenMP first and last privatization syntax is the following:

```
firstprivate(list)
lastprivate(list)
``` where list is defined as: a list item is a variable name or common block name (enclosed in slashes), subject to the restrictions specified in each of the sections describing clauses and directives for which a list appears.

This definition is extended to let a list item include a Fortran array section for the firstprivate and lastprivate constructs. Semantically, it means that the compiler should copy in or copy out only the specified array section. An implementing compiler is free to ignore this request. This allows the compiler to perform a full copy if it is more efficient than doing the partial copy.

An example of the extended syntax that could be used for the preceding example is:

```
firstprivate(a(1))
lastprivate(a(2:m))
```

Figure 1B:
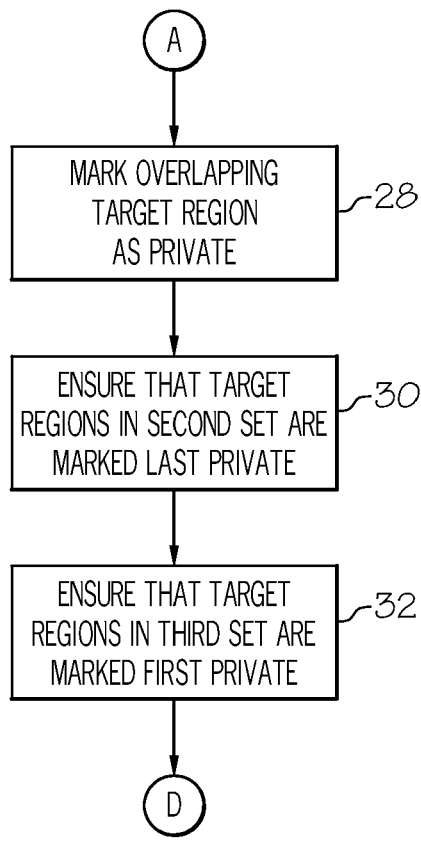
Figure 1C:
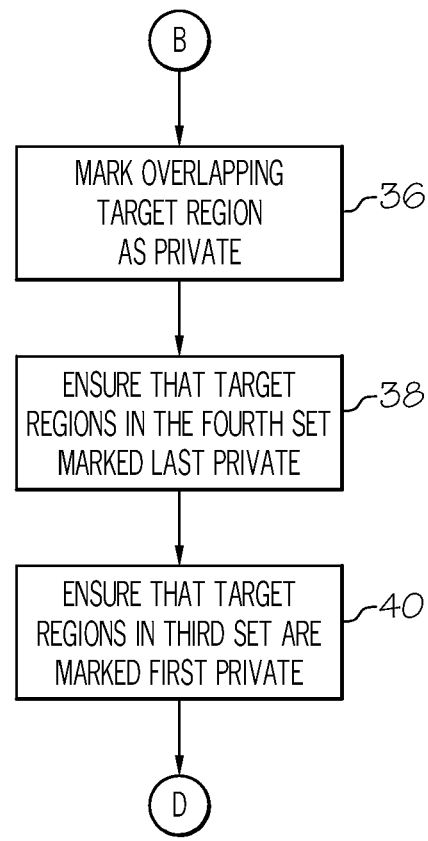
Figure 1D:
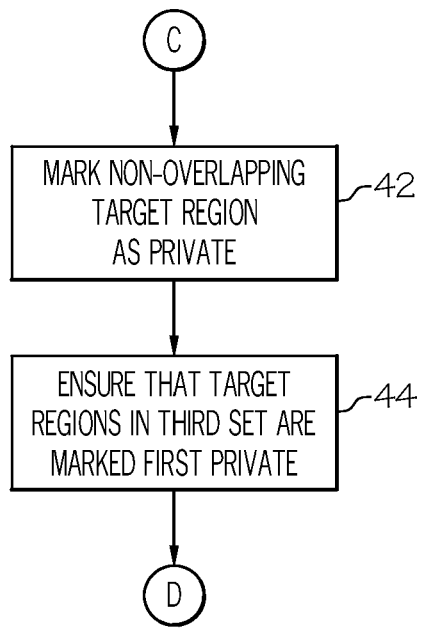

Turning to the FIGS. 1A-D, a flow diagram for a computer-implemented method for determining whether an array within a loop can be privatized for that loop is generally shown. At a block 10 all target regions within the array are identified. The target regions include regions that are accessed by the loop, wherein access to such region is controlled by a guard (GAR). At a block 12 a first set of target regions consisting of all elements that may be overwritten (MayDef) is identified. At a block 14 a second set of target regions consisting of all elements that will definitely be overwritten (MustDef) is identified. At a block 16 a third set of target regions consisting of all elements having a use not preceded by a definition along a path from a header of the loop (UpExpUse) is identified. At a block 18 a fourth set of target regions consisting of all array elements that are to be accessed by code intended to be executed after the loop has been executed (LiveOnExit) is identified.

At a block 20 it is determined whether, in any iteration of the loop, a target region in the first set of target regions overlaps any of the target regions in the third set of target regions. If a target region in the first set of target regions overlaps any of the target regions in the third set of target regions, then the routine quits at a block 22. If a target region in the first set of target regions does not overlap any of the target regions in the third set of target regions, then it is determined at a block 24 whether that target region overlaps any of the target regions in the fourth set of target regions, for any iteration of the loop.

If a target region in the first set of target regions overlaps any of the target regions in the fourth set of target regions, then it is determined at a block 26 whether the first set of target regions is contained within the second set of target regions over all iterations of the loop. It will be appreciated that this determination (i.e., block 26) can be performed once for all iterations of the routine.

If the first set of target regions is contained within the second set of target regions over all iterations of the loop, then mark, at a block 28, as private the target region within the first set of target regions that was determined to overlap any of the fourth set of target regions. Further, ensure at a block 30 that each target region within the second set is marked as last private, and, where the third set contains target regions, ensure at a block 32 that each target region within the third set is marked as first private. These only need to be marked once and should remain marked, whereby they do not need to be marked at each subsequent iteration.

If at least one iteration of the loop exist for which the first set is not contained within the second set, then it is determined at a block 34 whether the second set of target regions is contained within the fourth set of target regions over all iterations of the loop.

If the second set of target regions is contained within the fourth set of target regions over all iterations of the loop, the mark, at a block 36, as private the target region within the first set of target regions that was determined to overlap any of the fourth set of target regions. Further, ensure at a block 38 that each target region within the fourth set is marked as last private, and, where the third set contains target regions, ensuring at a block 40 that each target region within the third set is marked as first private.

If the target region in the first set of target regions does not overlap an of the target regions in the fourth set of target regions for any iteration of the loop, then mark, at a block 42, the target region in the first set of target regions does not overlap an of the target regions in the fourth set of target regions as private. Further, where the third set contains target regions ensure, at a block 44, that each target region within the third set is marked as first private.

The foregoing is repeated for each target region in the first set of target regions, until all of the target regions in the first set of target regions have been considered.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for determining whether an array within a loop can be privatized for that loop, the method comprising:
   (a) identifying target regions within an array, the target regions being accessible by a loop with access to the target regions being controlled by a guard, the identifying includes identifying a first set of the target regions that includes elements of the array that may be overwritten, the identifying includes identifying a second set of the target regions that includes elements of the array that will be overwritten, the identifying includes identifying a third set of the target regions that includes elements of the array that have a use not preceded by a definition along a path from a header of the loop, the identifying includes identifying a fourth set of the target regions that includes elements of the array that are accessible by code intended to be executed after the loop has been executed;
   (b) determining, in any iteration of the loop, if a target region in the first set of the target regions overlaps any of the target regions in the third set of the target regions;
   (c) when the target region in the first set of the target regions has been determined not to overlap any of the target regions in the third set of the target regions, determining, in any iteration of the loop, if the target region in the first set of the target regions overlaps any of the target regions in the fourth set of the target regions;
   (d) when the target region in the first set of the target regions has been determined to overlap any of the target regions in the fourth set of the target regions, determining, over all iterations of the loop, if the first set of the target regions is contained in the second set of the target regions;
   (e) when the first set of the target regions has been determined to be contained in the second set of the target regions, marking as private the target region in the first set of target regions that has been determined to overlap any of the target regions in the fourth set of target regions, ensuring that each of the target regions in the second set of target regions is marked as last private and that each of the target regions in the third set of target regions is marked as first private; and
   (f) repeating steps (c)-(e) for a each of the other target regions in the first set of target regions.

2. The computer-implemented method of claim 1, further comprising:

(g) when the first set of the target regions has been determined not to be contained in the second set of the target regions for at least one iteration of the loop, determining, over all iterations of the loop, if the second set of target regions is contained the fourth set of target regions; and (h) when the second set of the target regions has been determined to be contained in the fourth set of the target regions for at least one iteration of the loop, marking as private the target region in the first set of target regions that been determined to overlap any of the target regions in the fourth set of target regions, ensuring that each of the target regions in the fourth set target regions is marked as last private that each of the target regions in the third set of target regions is marked as first private; and (i) repeating steps (c)-(e) and (g)-(h) for a each of the other target regions in the first set of target regions.

3. The computer-implemented method of claim 2, further comprising:

(j) when the target region in the first set of the target regions has been determined not to overlap any of the target regions in the fourth set of the target regions, marking as private the target region in the first set of target regions that has been determined not to overlap any of the target regions in the fourth set of target regions, ensuring that each of the target regions in the third set of target regions is marked as first private (k) repeating steps (c)-(e), (g)-(h), and (j) for a each of the other target regions in the first set of target regions.

4. A storage medium encoded with machine-readable computer program code for determining whether an array within a loop can be privatized for that loop, the storage medium including instructions for causing a computer to implement a method comprising:

(a) identifying target regions within an array, the target regions being accessible by a loop with access to the target regions being controlled by a guard, the identifying includes identifying a first set of the target regions that includes elements of the array that may be overwritten, the identifying includes identifying a second set of the target regions that includes elements of the array that will be overwritten, the identifying includes identifying a third set of the target regions that includes elements of the array that have a use not preceded by a definition along a path from a header of the loop, the identifying includes identifying a fourth set of the target regions that includes elements of the array that are accessible by code intended to be executed after the loop has been executed;

(b) determining, in any iteration of the loop, if a target region in the first set of the target regions overlaps any of the target regions in the third set of the target regions;

(c) when the target region in the first set of the target regions has been determined not to overlap any of the target regions in the third set of the target regions, determining, in any iteration of the loop, if the target region in the first set of the target regions overlaps any of the target regions in the fourth set of the target regions;

(d) when the target region in the first set of the target regions has been determined to overlap any of the target regions in the fourth set of the target regions, determining, over all iterations of the loop, if the first set of the target regions is contained in the second set of the target regions;

(e) when the first set of the target regions has been determined to be contained in the second set of the target regions, marking as private the target region in the first set of target regions that has been determined to overlap any of the target regions in the fourth set of target regions, ensuring that each of the target regions in the second set of target regions is marked as last private and that each of the target regions in the third set of target regions is marked as first private; and (f) repeating steps (c)-(e) for a each of the other target regions in the first set of target regions.

5. The storage medium of claim 4, wherein the method further comprises:

(g) when the first set of the target regions has been determined not to be contained in the second set of the target regions for at least one iteration of the loop, determining, over all iterations of the loop, if the second set of target regions is contained the fourth set of target regions; and (h) when the second set of the target regions has been determined to be contained in the fourth set of the target regions for at least one iteration of the loop, marking as private the target region in the first set of target regions that been determined to overlap any of the target regions in the fourth set of target regions, ensuring that each of the target regions in the fourth set target regions is marked as last private that each of the target regions in the third set of target regions is marked as first private; and (i) repeating steps (c)-(e) and (g)-(h) for a each of the other target regions in the first set of target regions.

6. The storage medium of claim 5, wherein the method further comprises:

(j) when the target region in the first set of the target regions has been determined not to overlap any of the target regions in the fourth set of the target regions, marking as private the target region in the first set of target regions that has been determined not to overlap any of the target regions in the fourth set of target regions, ensuring that each of the target regions in the third set of target regions is marked as first private (k) repeating steps (c)-(e), (g)-(h), and (j) for a each of the other target regions in the first set of target regions.

* * * * *